United States Patent [19]

Wu

[11] Patent Number: 5,244,051

[45] Date of Patent: Sep. 14, 1993

[54] CENTRAL STEERABLE DRIVING MEANS OF WHEELCHAIR

[76] Inventor: Kung-Hsiung Wu, c/o Hung Hsing Patent Service Center, P.O. Box 55-1670, Taipei (10477), Taiwan

[21] Appl. No.: 787,104

[22] Filed: Nov. 4, 1991

[51] Int. Cl.$^5$ ............................................... B60K 1/00
[52] U.S. Cl. ....................................... 180/13; 74/498; 180/907; 280/304.1
[58] Field of Search .................. 180/11, 12, 13, 15, 180/907, 65.2; 280/304.1; 74/491, 498, 544

[56] References Cited

U.S. PATENT DOCUMENTS

| | | | |
|---|---|---|---|
| 2,448,992 | 9/1948 | Love et al. | 180/13 |
| 2,635,703 | 4/1953 | Goeller | 180/907 |
| 2,892,506 | 6/1959 | Slater | 180/907 |
| 3,198,276 | 8/1965 | Gordon | 180/11 |
| 3,387,681 | 6/1968 | Rabjohn | 180/13 |
| 4,368,795 | 1/1983 | Tidwell | 180/65.2 |
| 4,386,672 | 6/1983 | Coker | 180/907 |

FOREIGN PATENT DOCUMENTS 0122221 6/1971 Norway ............................... 180/13

Primary Examiner—Margaret A. Focarino
Assistant Examiner—Anne Marie Boehler

[57] ABSTRACT

A steerable driving device includes a driving rod rotatably mounted in a sleeve fixed on a bracket detachably secured on a central portion of a wheelchair, a handle secured on a crank arm perpendicularly secured to the driving rod, a driving wheel rotatably mounted on a front fork formed on a lower portion of the driving rod, and a driving motor electrically driven by a battery carried on the wheelchair, whereby upon a steering of the driving device by gripping the handle, the wheelchair may be driven steerably conveniently.

4 Claims, 3 Drawing Sheets

CENTRAL STEERABLE DRIVING MEANS OF WHEELCHAIR

BACKGROUND OF THE INVENTION

A conventional wheelchair generally includes a pair of large wheels rotatably mounted on two opposite sides of the chair and a pair of front casters pivotally mounted on two front side portions beyond the two large wheels. For driving the wheelchair, a patient sitting on the chair should rotate two push rims each secured on an outer portion of the large wheel easily causing tiredness for a patient especially for a weak patient. An electric wheelchair may be driven by electric power, which however should require two driving motors respectively installed on two wheels of the wheelchair to probably have the following drawbacks:

1. Two driving motors require two controllers to be disposed on two armrests of the wheelchair, increasing load of the chair and increasing installation cost thereof.

2. For turning either rightwardly or leftwardly, only a single motor on a single (right or left) side is actuated to slow down the turning operation and to cause an unstable driving operation since the driving force acted by such a single-side motor is unbalanced.

The present inventor has found the drawbacks of a conventional wheelchair and invented the present central steerable driving means for a wheelchair.

SUMMARY OF THE INVENTION

The object of the present invention is to provide a steerable driving device including a driving rod rotatably mounted in a sleeve fixed on a bracket detachably secured on a central portion of a wheelchair, a handle secured on a crank arm perpendicularly secured to the driving rod, a driving wheel rotatably mounted on a front fork formed on a lower portion of the driving rod, and a driving motor electrically driven by a battery carried on the wheelchair, whereby upon a steering of the driving device by gripping the handle, the wheelchair may be driven steerably conveniently.

DETAILED DESCRIPTION

Figure 1:
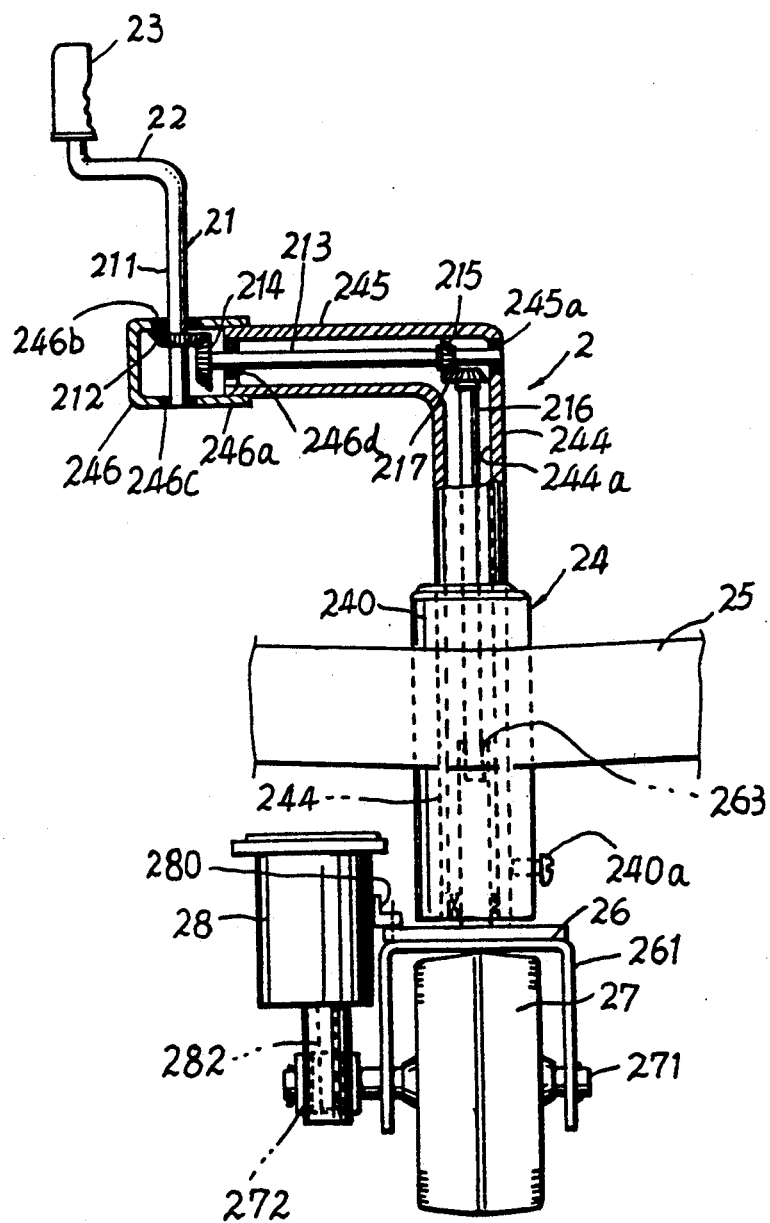
FIG. 1 is a partial sectional drawing of the present invention.
Figure 1A:
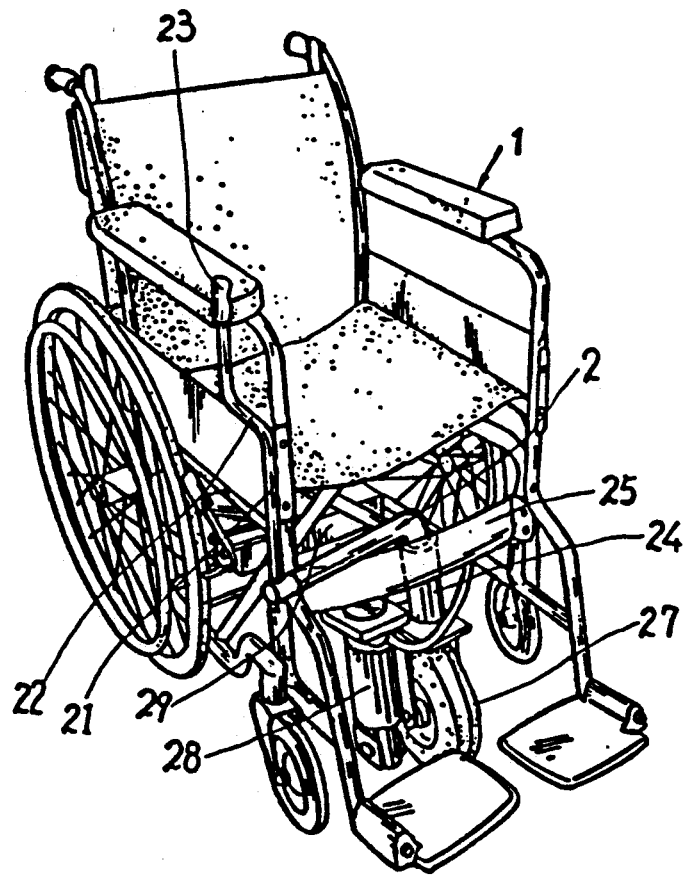
FIG. 1a is an illustration of the present invention when assembled on a wheelchair.

As shown in FIG. 1, a central steerable driving means 2 is detachably mounted on a central portion of a wheelchair 1 of the present invention which includes a driving rod means 21 having a crank arm member 22 perpendicularly secured to an upper portion of the driving rod means 21 having a handle 23 protruding upwardly from an end portion of the crank arm member 22, a sleeve means 24 for rotatably mounting the driving rod means 21, a bracket 25 fixed with the sleeve means 24 thereon and secured on a central front portion of a wheelchair 1, a front fork means 26 secured on a lower portion of the driving rod means 21 having a pair of fork members 261 and an extending rod 263 protruding upwardly from the fork members 261 for connecting the driving rod means 21, a driving wheel 27 rotatably mounted on the pair of fork members 261 of the front fork means 26, a driving motor 28 powered by a battery 29 (not shown) carried on the wheelchair fixed on the front fork means 26. The driving rod means includes a first driving rod 211 vertically pivotally mounted in an outer end portion 246 of a horizontal pipe 245 protruding either rightwardly or leftwardly towards a right armrest or left armrest of the wheelchair, a second driving rod 216 secured to an extending rod 263 formed on the front fork means 26 vertically rotatably held within a vertical pipe 244 which is rotatably held in a main sleeve portion 240 vertically secured with the bracket 25 and a transmission means 213 operatively coupling the first driving rod 211 and the second driving rod 216 held in the horizontal pipe 245 perpendicularly secured to an upper portion of the vertical pipe 244. Thereby, upon a steering operation of the handle 23 positioned at a right or left armrest to swing the crank arm member 22 and rotate the first driving rod 21, the second driving rod 216 will be driven through the transmission means 213 for rotating the front fork means 26 and wheel 27 for steering the wheelchair 1.

The driving motor 28, which may be a direct-current motor, is mounted on the front fork means 26 by fixing a motor holder 280 on the fork means 26 by welding or by other fixing method. The driving motor 28 may drive the axle 271 of the wheel 27 by engaging a worm 282 formed on a motor shaft with a worm gear 272 secured on the axle 271 of the wheel 27.

The rightwardly (or leftwardly) protruded handle 23 as shown in FIG. 1 may be used by those patient or user having a disabled left (or right) hand so that he may use his single right hand for driving the handle 23 for steering the wheelchair 1.

The transmission means 213 as shown in FIG. 1 includes a transmission rod pivotally mounted in two bearings 245a, 246d formed on two end portions of the horizontal pipe 245 having a first bevel gear 214 formed on a first end of the transmission rod engageable with a driving bevel gear 212 formed on a lower end of the first driving rod 211 and a second bevel gear 215 formed on a second end of the transmission rod opposite to the first bevel gear 214 to be engageable with a follower bevel gear 217 secured on an upper end of the second driving rod 216.

A locking screw 240a is provided on the main sleeve portion 240 for fixing the vertical pipe 244 when the handle 23 is moved towards a fixed right (or left) side of a wheelchair, allowing a steering operation by the handle 23.

The outer end portion 246 of the horizontal pipe 245 of the sleeve means 24 as shown in FIG. 1 is formed as an end cap 246 having a perimeter 246a of the cap sealing an outer end opening of the horizontal pipe 245, an upper bearing 246b and a lower bearing 246c formed on an upper portion and a lower portion of the cap 246 vertically rotatably securing the first driving rod 211 in the two bearings 246b, 246c.

Figure 2:
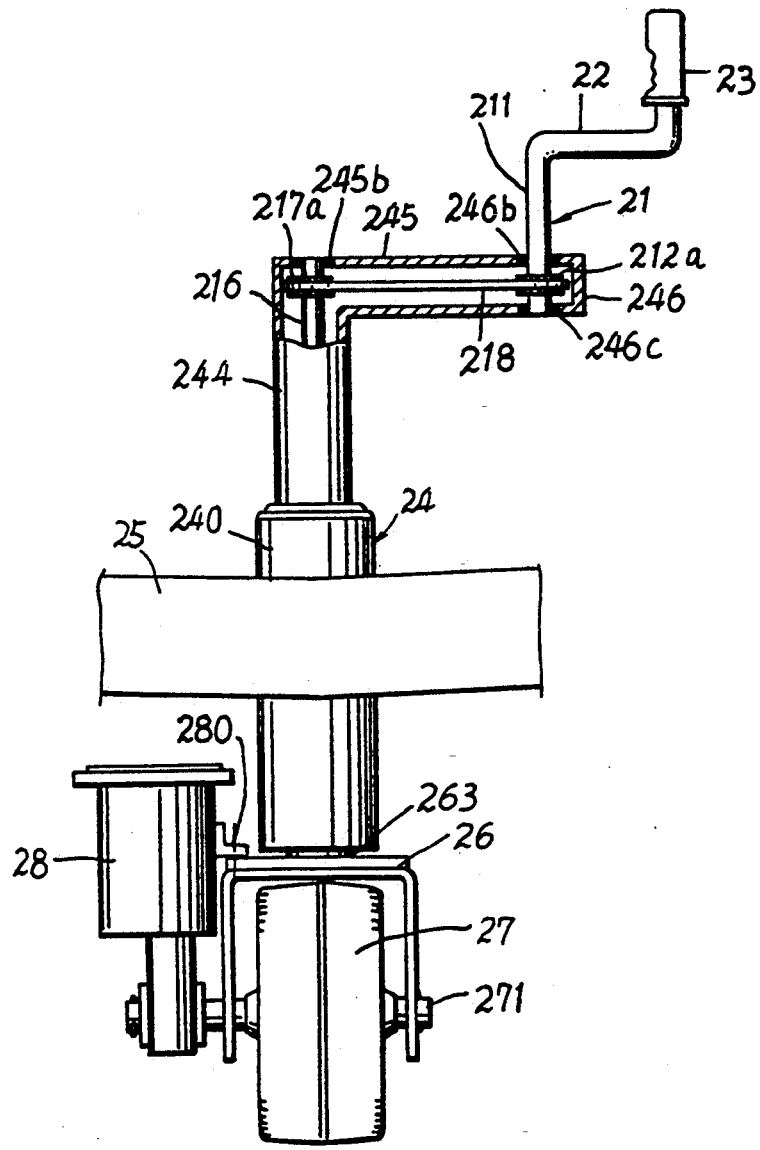
FIG. 2 shows another preferred embodiment of the present invention.

The transmission means may be modified to be a transmission belt 218 as shown in FIG. 2 having a first belt end wound on a driving pulley 212a secured on a lower portion of the first driving rod 211 and a second belt end wound on a follower pulley 217a secured on an upper portion of the second driving rod 216.

The driving motor 28 of the present invention may be provided with a gear box (not shown) for reducing a rotating speed of the motor. The wheelchair 1 used in this invention may be four wheels or two wheels, to which the driving wheel 27 of this invention is added to become a five-wheel or triple-wheel wheelchair. The push button or controller 231 provided on the handle 23 may be designed for on-off control or speed control, etc.

I claim:

1. A steerable driving means detachably mounted on a central portion of a wheelchair comprising: a driving rod means, a crank arm member secured to an upper portion of a first driving rod of the driving rod means, a handle protruding upwardly from an end portion of the crank arm member, a sleeve means for rotatably mounting the driving rod means, a bracket fixed with the sleeve means thereon and secured on a central front portion of a wheelchair, a front fork means secured on a lower portion of the driving rod means, a driving wheel rotatably mounted on the front fork means, a driving motor powered by a battery carried on the wheelchair and fixed on the front fork means; the driving rod means including the first driving rod vertically pivotally mounted in an outer end portion of a horizontal pipe protruding either rightwardly or leftwardly towards a right armrest or left armrest of the wheelchair, a second driving rod secured to an extending rod formed on the front fork means vertically rotatably held within a vertical pipe which is rotatably held in a main sleeve portion of said sleeve means vertically secured with the bracket and a transmission means operatively coupling the first driving rod and the second driving rod held in the horizontal pipe perpendicularly secured to an upper portion of the vertical pipe, whereby upon a steering operation of the handle and the crank arm member positioned at a right or left armrest to rotate the first driving rod, the second driving rod will be driven through the transmission means for rotating the front fork means and wheel for steering the wheelchair.

2. A steerable driving means according to claim 1, wherein said transmission means includes a transmission rod pivotally mounted in two bearings formed on two end portions of the horizontal pipe having a first bevel gear formed on a first end of the transmission rod engageable with a driving bevel gear formed on a lower end of the first driving rod and a second bevel gear formed on a second end of the transmission rod opposite to the first bevel gear to be engageable with a follower bevel gear secured on an upper end of the second driving rod.

3. A steerable driving means according to claim 1, wherein a locking screw is provided on the main sleeve portion for fixing the vertical pipe when the handle is moved towards a fixed side of a wheelchair, allowing a steering operation by the handle.

4. A steerable driving means according to claim 1, wherein said transmission means is a transmission belt having a first belt end wound on a driving pulley secured on a lower portion of the first driving rod and a second belt end wound on a follower pulley secured on an upper portion of the second driving rod.

* * * * *